(12) United States Patent
Chechik et al.

(10) Patent No.: US 8,805,812 B1
(45) Date of Patent: *Aug. 12, 2014

(54) LEARNING SEMANTIC IMAGE SIMILARITY

(71) Applicant: Google Inc., Mountain View, CA (US)

(72) Inventors: Gal Chechik, Sunnyvale, CA (US);
Samy Bengio, Mountain View, CA (US);
Varun Sharma, Haryana (IN)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/867,937

(22) Filed: Apr. 22, 2013

Related U.S. Application Data

(63) Continuation of application No. 12/638,704, filed on Dec. 15, 2009, now Pat. No. 8,429,168.

(51) Int. Cl.
*G06F 17/30* (2006.01)

(52) U.S. Cl.
USPC .......................................... 707/705; 707/706

(58) Field of Classification Search
USPC .................................. 707/706, 707
See application file for complete search history.

(56) References Cited

U.S. PATENT DOCUMENTS

| 5,751,286 | A | 5/1998 | Barber et al. | |
|---|---|---|---|---|
| 7,139,739 | B2* | 11/2006 | Agrafiotis et al. | 706/20 |
| 7,412,427 | B2 | 8/2008 | Zitnick et al. | |
| 7,773,800 | B2 | 8/2010 | Liu | |
| 8,126,647 | B2* | 2/2012 | Hruska et al. | 702/7 |
| 8,429,168 | B1 | 4/2013 | Chechik et al. | |
| 2007/0179921 | A1 | 8/2007 | Zitnick et al. | |
| 2009/0254281 | A1* | 10/2009 | Hruska et al. | 702/7 |
| 2012/0102066 | A1 | 4/2012 | Eronen et al. | |

OTHER PUBLICATIONS

Maji et al. "Classification using Intersection Kemal Support Vector Machines is Efficient." Retrieved from interne http://cs.berkeley.edu., 8 pages.
Granger et al. "A Discriminative Kernal-based Model to Rank Images from Text Queries." Retrieved from internet http://uchicago.edu., 14 pages.
Grigorova et al. "Content-Based Image Retrieval by Feature Adaptation and Relevance Feedback." IEEE Transactions on Multimedia, vol. 9, No. 6, Oct. 2007, pp. 1183-1192.

* cited by examiner

*Primary Examiner* — Baoquoc N To
(74) *Attorney, Agent, or Firm* — Fish & Richardson P.C.

(57) ABSTRACT

Methods, systems, and apparatus, including computer programs encoded on a computer storage medium, for identifying similar images. In some implementations, a method is provided that includes receiving a collection of images and data associated with each image in the collection of images; generating a sparse feature representation for each image in the collection of images; and training an image similarity function using image triplets sampled from the collection of images and corresponding sparse feature representations.

20 Claims, 6 Drawing Sheets

LEARNING SEMANTIC IMAGE SIMILARITY

CROSS REFERENCE TO RELATED APPLICATIONS

This application is a continuation of and claims priority to U.S. patent application Ser. No. 12/638,704, filed on Dec. 15, 2009, now U.S. Pat. No. 8,429,168, the entire contents of which are hereby incorporated by reference.

BACKGROUND

This specification relates to identifying similar images.

Search engines aim to identify resources (e.g., images, audio, video, web pages, text, documents) that are relevant to a user's needs and to present information about the resources in a manner that is most useful to the user. Search engines return a set of search results in response to a user submitted text query. For example, in response to an image search text query (i.e., a query to identify image resources), the search engine returns a set of search results identifying image resources responsive to the query (e.g., as a group of thumbnail representations of the image resources).

However, in some cases users may want to enter a query that is not textual. For example, a user that has an image may wish to search for similar or related images. Additionally, a user can be interested in refining the results of a previous image search to identify images similar to an image in the presented search results.

Some conventional techniques for learning image similarity rely on human raters that determine the relative similarity of image pairs. For example, a human rater can be presented with several object pairs and asked to select the pair that is most similar. Relative similarity can also be identified using common labels associated with images or that are provided in response to a common query.

Learning semantic similarity for images becomes difficult as the number of images increases. For example, learning pairwise similarity for image set including billions of images results in a quadratic number of pairs to compute, which is typically time and resource prohibitive using conventional techniques.

SUMMARY

This specification describes technologies relating to identifying similar images.

In general, one aspect of the subject matter described in this specification can be embodied in methods that include the actions of receiving a collection of images and data associated with each image in the collection of images; generating a sparse feature representation for each image in the collection of images; and training an image similarity function using image triplets sampled from the collection of images and corresponding sparse feature representations. Other embodiments of this aspect include corresponding systems, apparatus, and computer program products.

These and other embodiments can optionally include one or more of the following features. The collection of images is identified using collection of image search queries and a specified number of image resources identified in ranked results responsive to each image query. The data associated with each image in the collection of images is the corresponding image search query. The data associated with each image in the collection of images is a label associated with the image. Each image triplet identifies an image, a less relevant image, and a more relevant image. The similarity function is trained such that: $S(p_i, p_i^+) > S(p_i, p_i^-) + c$, $\forall p_i, p_i^+, p_i^- \in P$, where $S(p_i, p_i^+)$ is a similarity score for a pair of more relevant images, $S(p_i, p_i^-)$ is a similarity score for a pair of less relevant images for a collection of images P, and c is a constant. Training the image similarity function further comprises iteratively sampling image triplets $p, p_i^+, p_i^-$ from a collection of images such that the relative similarity, r, for $r(p_i, p_i^+) > r(p_i, p_i^-)$ and using sparse feature representations of the sampled images to update a similarity matrix for each iteration. Generating a sparse feature representation for an image further includes dividing the image into blocks; generating an edge histogram and a color histogram for each block to determine local descriptors for the image; and combining the local descriptors to obtain a sparse feature representation of the image.

In general, one aspect of the subject matter described in this specification can be embodied in methods that include the actions of receiving an image search query; presenting image search results responsive to the image search query; receiving an input requesting images similar to an image of the image search results; identifying similar images in response to the input using a similarity matrix; and presenting one or more similar images. Other embodiments of this aspect include corresponding systems, apparatus, and computer program products.

Particular embodiments of the subject matter described in this specification can be implemented so as to realize one or more of the following advantages. A system can learn similarity for a large collection of images efficiently and with high accuracy. Semantically similar images to an identified image can be provided to users.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
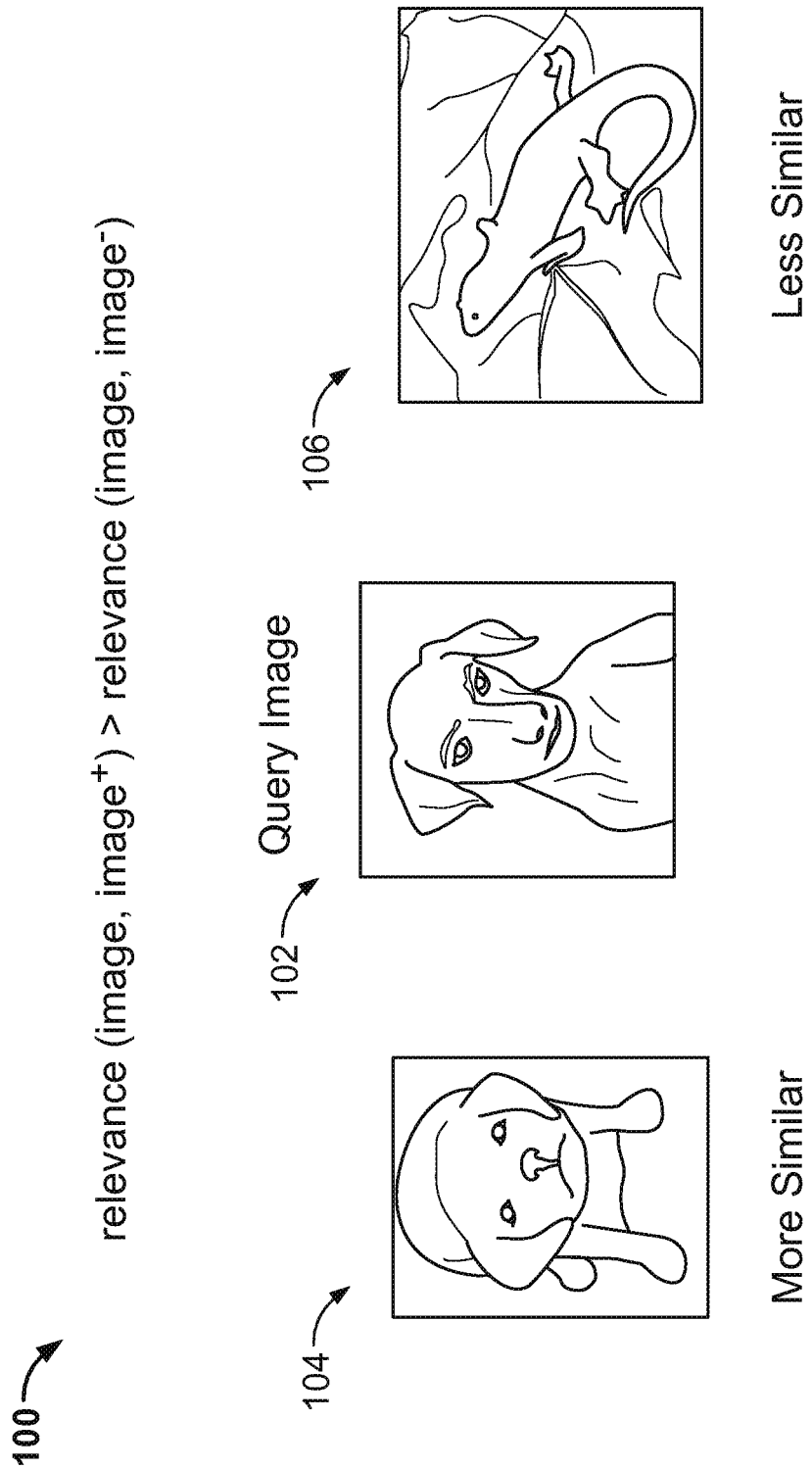
FIG. 1 shows a representation illustrating relative similarity between images.

FIG. 1 shows a representation 100 illustrating relative similarity between images. Relative similarity is a measure of similarity of one image as compared with another image. Thus, given an image triplet sampled from a collection of images, a similarity of an image relative to the other two images can be determined e.g., based on labeling, query data, or other information about the images. Generally, given two pairs of images where the images in the first pair are more similar to one another than the two images in the second pair, the system will give the first pair a higher similarity score. For example, FIG. 1 shows an example query image 102 (e.g., an image as a query as opposed to a text query) showing a dog. When grouped in a triplet with a second image 104 (dog) and a third image 106 (lizard), the goal is for the system to identify the dog to be more similar to the query image 102 than to the lizard (e.g., the similarity score of the pair (dog, dog) is greater than the similarity score for (dog, lizard).

Thus, a basic relationship is identified between the images such that the relevance of the pair (image, image$^+$) is great than the relevance of the pair (image, image$^-$), where relevance (image$^1$, image$^2$) represents the relevance between the query image 102 and the second image 104 and relevance (image, image$^-$) represents the relevance between the query image 102 and the third image 106, where "image$^+$" means the image is more relevant to the query image than "image$^-$".

The relevance can be used to determine the similarity between images. In particular, the system can use this general relevance relationship to learn a similarity scoring function that matches the degree of relevance for all triplets, (image, image$^+$, image) such that $S_w$(image, image$^+$)>$S_w$(image, image$^-$)+constant, where Sw represents a similarity score and the constant (e.g., "1") allows control over the degree of difference in similarity scores (i.e., a degree of how similar and non-similar images are required to be).

Figure 2:
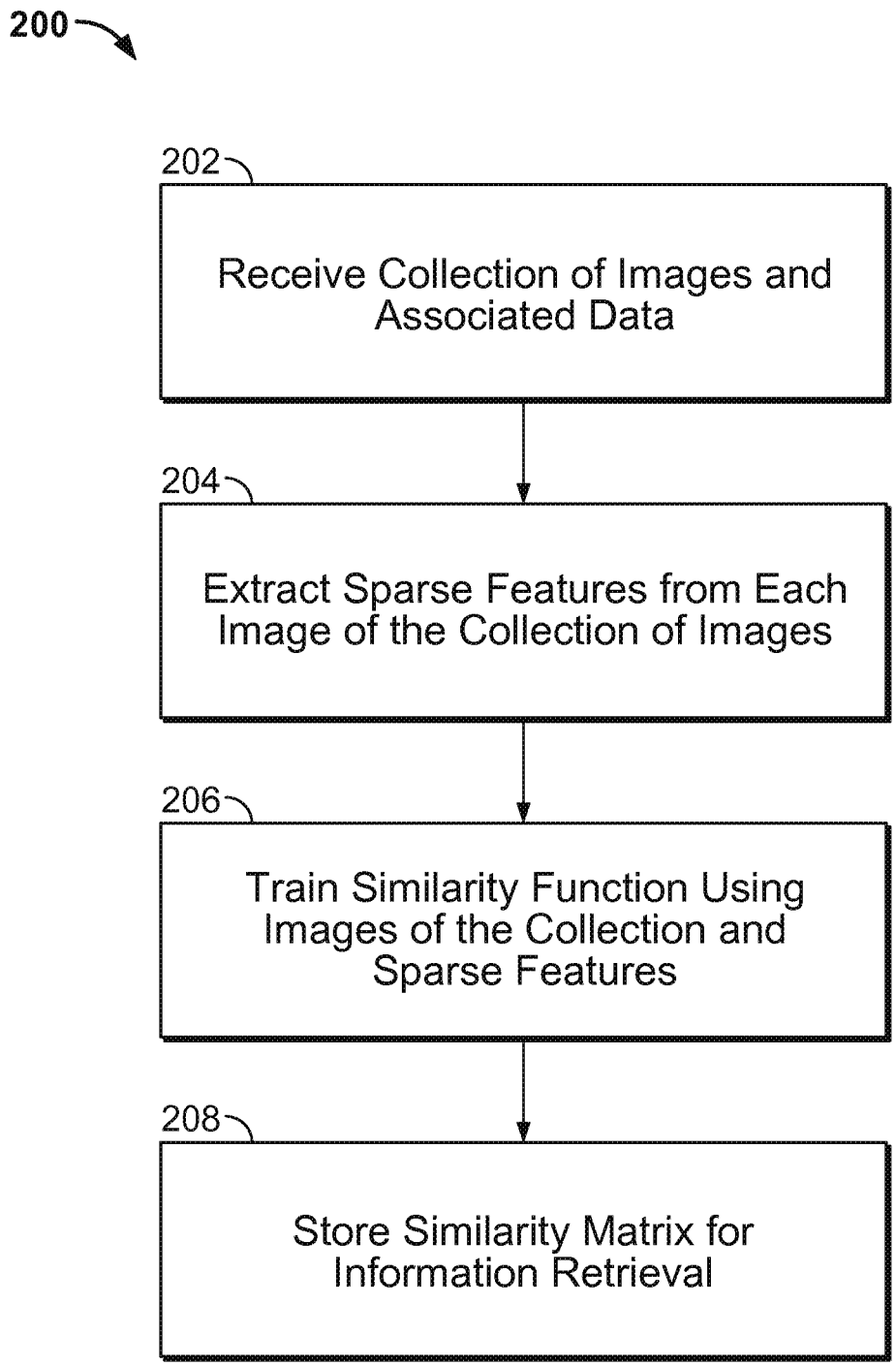
FIG. 2 is a flow chart of an example method for mapping similar images.

FIG. 2 is a flow chart of an example method 200 for training an image similarity function. For convenience, the method 200 will be described with respect to a system that performs the method 200.

The system receives 202 a collection of images and associated data. The images in the collection of images can be received from one or more sources. For example, the images can be images from a repository returned in response to one or more of a collection of image search text-queries. As such, the associated data (e.g., metadata) for each image can also include the one or more image search queries to which the image was responsive. Thus, for each image search query, a group of responsive images are identified.

Alternatively, the images can be received from an annotated corpus of images. The annotation can include a labeling associated with the respective images (e.g., as image metadata, image file name, text associated with the image in a particular resource, for example, in a web page). Thus, for each label there are a group of one or more images having the label. Additionally, one or more labels can belong to broader categories. Thus, two images can have separate labels but belong to the same category.

As will be described in greater detail below, an image sharing a query or a label with another image is likely to be more relevant relative to an image that does not share a label or query with the image. Similarly, an image sharing a category with another image is likely to be more relevant relative to an image that does not share the category.

The system extracts 204 sparse features from each image of the collection of images. The system extracts sparse features in order to generate a sparse feature vector representation of each image in the collection of images. One method for generating sparse feature vectors from images will be described below respect to FIG. 3.

The system trains 205 a similarity function using the images of the collection. The similarity function is represented in the form of a similarity matrix, and is learned from examples of image pairs. Once trained, the similarity function provides a similarity measure (e.g., a score) given any pair of two images. In particular, during training the system uses image triplets satisfying a relative relevance criteria along with the sparse feature vectors in order to train the similarity function. An iterative training process using a passive-aggressive learning technique is described in greater detail below with respect to FIG. 5.

The system stores 208 the similarity matrix for use in retrieving similar images to an image in the collection. In particular, for a given image of the collection, the system can identify and provide similar images using the similarity matrix.

Figure 3:
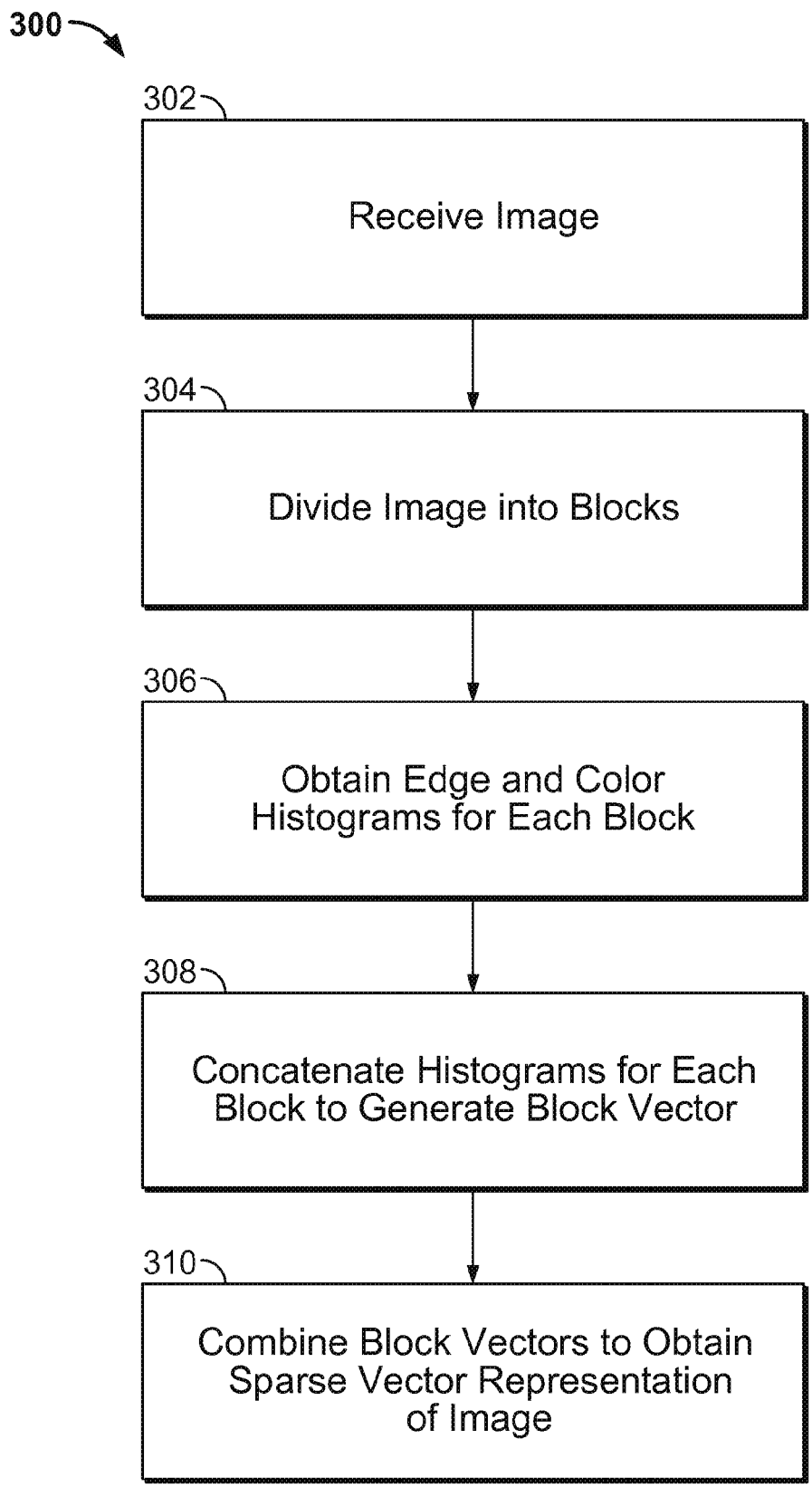
FIG. 3 is a flow chart of an example method for extracting sparse features from an image.

FIG. 3 is a flow chart of an example method 300 for extracting sparse features from an image. For convenience, the method 300 will be described with respect to a system that performs the method 300. The system receives 302 an image. The image can be, for example, an image from a collection of images (received, for example, as described above) to be used in building a similarity matrix for the collection.

The system divides 304 the image into blocks. In some implementations, the blocks are rectangular or square shaped. In some alternative implementations, other shapes, both polygonal and non-polygonal are used. In some implementations, each block overlaps adjacent blocks by a specified amount along one or more axes.

The system generates 306 an edge and color histogram for each block. The edge histogram for each block can be generated using uniform local binary patterns that provide texture descriptors. Local binary patterns estimate a texture histogram of a block by considering differences in intensity at circular neighborhoods centered on each pixel. In some implementations, a local binary pattern 8,2 is used. This means that a circle of radius 2 is considered centered on each block. For each circle, the intensity of the center pixel is compared to the interpolated intensities located at 8 equally-spaced locations on the circle. If the center pixel has a higher intensity value than an interpolated intensity at a location, a binary 0 is given for that location on the circle. If the center pixel has a lower intensity value than an interpolated intensity at a location, a binary 1 is given for that location on the circle. An 8-bit sequence of binary values is generated from the comparison.

Figure 4:
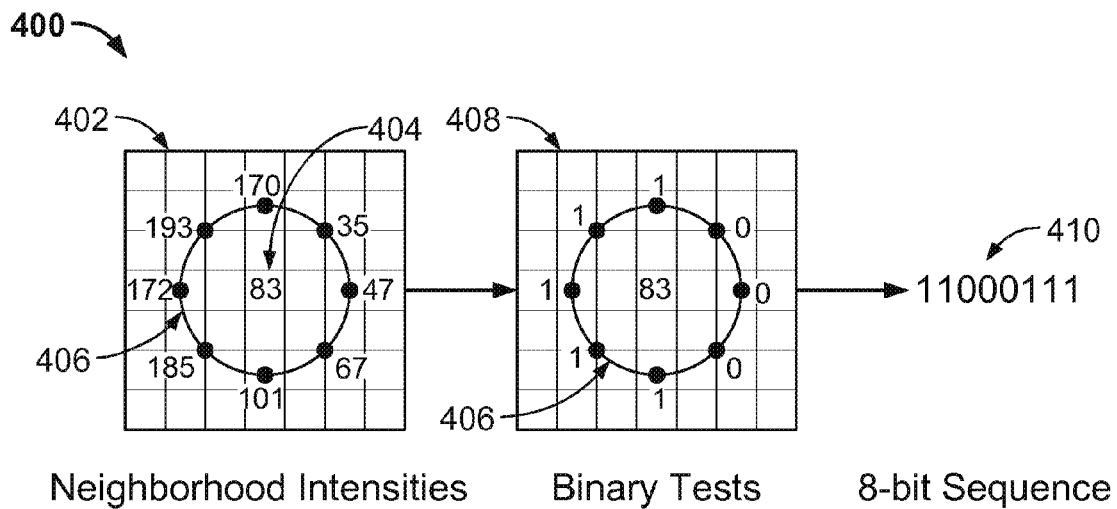
FIG. 4 is a diagram representing an example of generating an edge histogram for an image block.

FIG. 4 is a diagram 400 representing an example of generating an edge histogram for an image block. A pixel grid 402 includes a center pixel 404 (having intensity value 83) and a circle 406 showing the interpolated intensities located at 8 equally-spaced location on the circle 406 (e.g., 67, 101, 185). A pixel grid 408 shows the circle 406 along with binary values at the locations responsive to the comparison of location intensities with the intensity of the center pixel. For example, since the center pixel's intensity value of 83 is less than the location interpolated intensity value of 101, a binary 1 is recorded for that location. The binary values are used to generate a sequence 410 of binary values (e.g., 11000111).

Each block pixel is mapped to a sequence among $2^8$=256 possible sequences and each block can therefore be represented as a 256 bin histogram. Additionally, the bins of the histogram that correspond to non-uniform sequences, that is, sequences with more than two transitions between 1 and 0, can be merged. This results in a compact, 59 bin, edge histogram where each color in the palette corresponds to a specific histogram bin. For example, k-means clustering can be applied to an RGB representation of pixels using, e.g., 20 clusters. The center of each cluster is thus a typical color. The system then generates, for a given block (e.g., corresponding to a region of 64×64 pixels) a histogram of how many times we have seen each of the 20 typical colors in that block.

The color histogram for each block can be generated using a clustering technique, for example, k-means clustering. A palette of colors is selected by training a color codebook from the red, green, and blue pixels of a large training set of images using k-means. The color histogram for the block is obtained by mapping each block pixel to the closest color in the codebook palette.

The system concatenates 308 the histograms for each block. Concatenating the histograms results in a single vector descriptor per block of the image, e.g., <edge histogram, color histogram>. These block vectors can be referred to as local descriptors of the image.

The system combines the local descriptors of each block to obtain a sparse feature representation for the image. Each local descriptor of an image p is represented as a discrete index referred to as a visual term ("visterm"). The image is therefore represented by a bag-of-visterms vector (analogous to a bag-of-words used in text analysis) in which each component $p_i$ is related to the presence or absence of visterm i in p.

The system maps the descriptors to discrete indexes according to a codebook C. The codebook can be learned from the local descriptors of the training images through k-means clustering. The codebook represents each image block by a nearest codeword. This creates a sparse code, for each image, where the sum of the sparse vector is the number of patches. The number of non-zero entries could be smaller since some vector entries have values >1. All the non-zero counts in the vector are normalized by assigning particular weights $p_i$ of each visterm. The assignment of the weight $p_i$ of visterm i in image p is defined by:

$$p_i = \frac{f_i d_i}{\sqrt{\sum_{j=1}^{|C|} (f_j d_j)^2}},$$

where $f_i$ is the term frequency if i in p, which refers to the number of occurrences of i in p, while $d_j$ is the inverse document frequency of i, which is defined as $-\log(r_j)$. $r_j$ is the fraction of training images containing at least one occurrence of visterm j.

Figure 5:
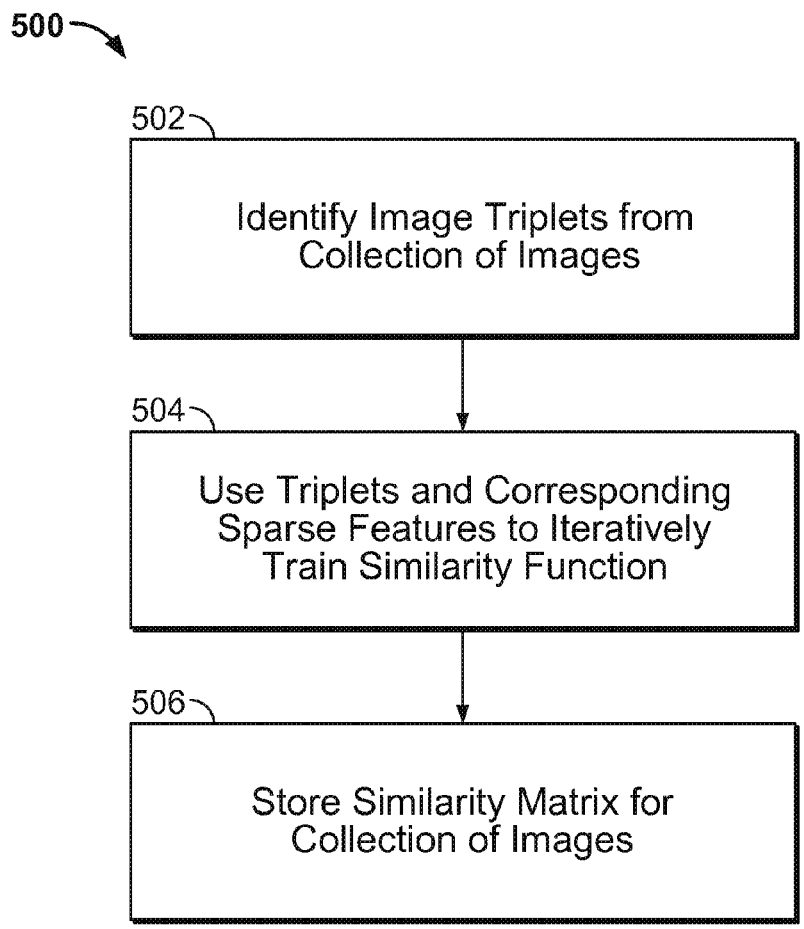
FIG. 5 is a flow chart of an example method for training an image similarity function.

FIG. 5 is a flow chart of an example method 500 for training an image similarity function. For convenience, the method 500 will be described with respect to a system that performs the method 500.

The system identifies 502 image triplets from a collection of images. Each image triplet includes an image, an image of greater similarity, and an image of lesser similarity ($p_i$, $p_i^+$, $p_i^-$). For a large collection of images, the triplets are not stored in memory. Instead, information about labels or queries associated with images can be used to construct triplets during the training process. Thus, for labels or queries, lists of relevant images are maintained.

In particular, to sample a triplet ($p_i$, $p_i^+$, $p_i^-$) during training, the system uniformly samples an image $p_i$ from the collection of images P. The system then samples an image $p_i^+$ from the images sharing the same labels or query with $p_i$. The system also samples an image $p_i^-$ from the images that do not share a label or query with $p_i$. When the collection of images P is very large and the number of labels or queries is also large, sets of non-relevant images do not need to be maintained. Instead, sampling $p_i^-$ directly from P, but not within the group of $p_i^+$ (e.g., same label or query), results in a non-relevant image with very high probability. Sampling can be repeated until a non-relevant image is found, or stopped after a few steps without adding a significant amount of noise.

In some alternative implementations where relevance feedback information $r(p_i, p_j)$ are provided as real numbers (e.g., not as "within a relevant set" or "not within a relevant set"), the system can use these number values to bias training toward those pairs that have a higher relevance feedback value. For example, if the similarity between two images is measured as the fraction of queries that both images are relevant for, a real number relevance value can be obtained. Similarly, a human evaluation experiment can be used to compare pairs of images where the evaluators are asked to provide numerical similarity values. This can be done by considering $r(p_i, p_j)$ as frequencies of appearance and sampling pairs according to the distribution of these frequencies.

The system uses 504 the triplets and the corresponding sparse feature vectors to iteratively train a similarity function.

Given information on the relative similarity for pairs of images, the system trains a pairwise similarity function S. In particular, for a set of images P, there is a pairwise relevance measure $r_{ij} = r(p_i, p_j) \in \Re$ where $p_i$ and $p_j$ represent respective images of a pair of images. The pairwise relevance measure identifies how strongly $p_i \in P$ is related to $p_i \in P$. In some implementations, the relevance measure encodes information that the two images of the pair belong to the same category or were responsive to a same query. However, more generally, full access to the values of r is not required. Instead, the system can compare some pairwise relevance scores to determiner which pair is more relevant (e.g., $r(p_i, p_j)$ and $r(p_i, p_k)$. Additionally, if a relevance value for a particular pair is not available, the value is zero. Using this information, the system seeks to learn a similarity function $S(p_i, p_j)$ that assigns higher similarity scores to pairs of more relevant images, $S(p_i, p_i^+) > S(p_i, p_i^-)$, $\forall p_i, p_i^+, p_i^- \in P$ such that $r(p_i, p_i^+) > r(p_i, p_i^+)$.

In the following, $p_i$ is used to denote both the image and its representation as a column vector $p_i \in \Re^d$. A parametric similarity function is used having the bilinear form:

$$S_w(p_i, p_j) \equiv p_i^T W p_j \quad \text{(equation 1)}$$

with $W \in \Re^{d \times d}$. If the images of $p_i$ are represented as sparse vectors, namely, only a number $k_i \ll d$ of the d entries in the vector $p_i$ are non-zeros, then the value of equation 1 an be computed efficiently with a large d. Specifically, $S_w$ can be calculated with complexity $O(k_i k_j)$ regardless of the dimensionality of d.

A passive-aggressive online learning technique is used to process triplets of images $p_i$, $p_i^+$, $p_i^- \in P$ from the set of images such that $S(p_i, p_i^+) > S(p_i, p_i^-) + 1$, where the +1 provides a safety margin to prevent false similarity results.

A hinge loss function for the image triplet is defined as follows:

$$l_w(p_i, p_i^+, p_i^-) = \max\{0, 1 - S_w(p_i, p_i^+) + S_w(p_i, p_i^-)\}$$

To minimize the loss, the passive-aggressive technique is applied iteratively to optimize W. First, W is initialized to some initial value $W^0$. At each training iteration, i, the system randomly selects a triplet ($p_i$, $p_i^+$, $p_i^-$), and uses the triplet to solve the following convex problem with soft margin:

$$W^i = \underset{W}{\arg\min} \frac{1}{2} \|W - W^{i-1}\|_{Fro}^2 + C\xi,$$

such that $l_w(p_i, p_i^+, p_i^-) \leq \xi$ and $\xi \geq 0$. $\|W - W^{i-1}\|_{Fro}^2$ is the Frobenius norm (point-wise L2 norm). Thus, at each iteration i, $W^i$ is selected to optimize a trade-off between remaining close to the previous parameters $W^{i-1}$ and minimizing the loss on the current triplet $l_w(p_i, p_i^+, p_i^-)$. An aggressiveness parameter C controls the trade-off.

Solving the convex problem reveals that the optimal $W = W^{i-1} + \tau V_i$, where $V_i$ is a gradient matrix $V^i = [p_i^1(p_k^+ - p_k^-), \ldots, p_i^d(p_k^+ - p_k^-)]^T$ and $\tau$ is $$\tau_i = \min C, \left\{ \frac{l_w^{j-1}(p_i, p_i^+, p_i^-)}{\|V^i\|^2} \right\}.$$

The similarity matrix W is not necessarily positive or symmetric. However, a variation of the passive-aggressive technique can be used to generate a symmetric solution. The similarity function is modified as: $\hat{S}_w(p_i, p_j) = -(p_i - p_j)^T W (p_i - p_j)$ with corresponding triple hinge loss function:

$$\hat{l}_w(p_i, p_i^+, p_i^-) = \max\{0, 1 - \hat{S}_w(p_i, p_i^+) + \hat{S}_w(p_i, p_i^-)\}.$$

Again, a convex optimization problem can be solved to obtain $W^i = W^{i-1} - \hat{\tau}_i \hat{V}^i$, where $\hat{V}^i$ is $\hat{V}^i = [(p_i - p_i^+)(p_i - p_i^+)^T - (p_i - p_i^-)(p_i - p_i^-)]^T$ and $\hat{\tau}_i$ is $$\hat{\tau}_i = \min\left\{ C, \frac{\hat{l}_w^{j-1}(p_i, p_i^+, p_i^-)}{\|\hat{V}^i\|^2} \right\}.$$

Since the matrix is symmetric, each update of W preserves its symmetry. Hence, if initialized with a symmetric $W^0$, a symmetric solution $W_i$ is guaranteed at any step i.

The system stores 506 the learned similarity matrix for the collection of images. The similarity matrix can be used to identify and provide similar images to an image in the collection.

The training technique described above can be represented by the following pseudo-code:
Initialization:
  Initialize $W^0 = I$
Iterations
  repeat
    Sample three images $p, p_i^+, p_i^-$, such that $r(p_i, p_i^-) > r(p_i, p_i^-)$.
    Update $W^i = W^{i-1} + \tau_i V^i$ where $\tau_i = \min\left\{ C, \frac{l_w^{j-1}(p_i, p_i^+, p_i^-)}{\|V^i\|^2} \right\}$ and $V^i = [p_i^1(p_k^+ - p_k^-), \ldots, p_i^d(p_k^+ - p_k^-)]^T$
  until (stopping criterion)

Figure 6:
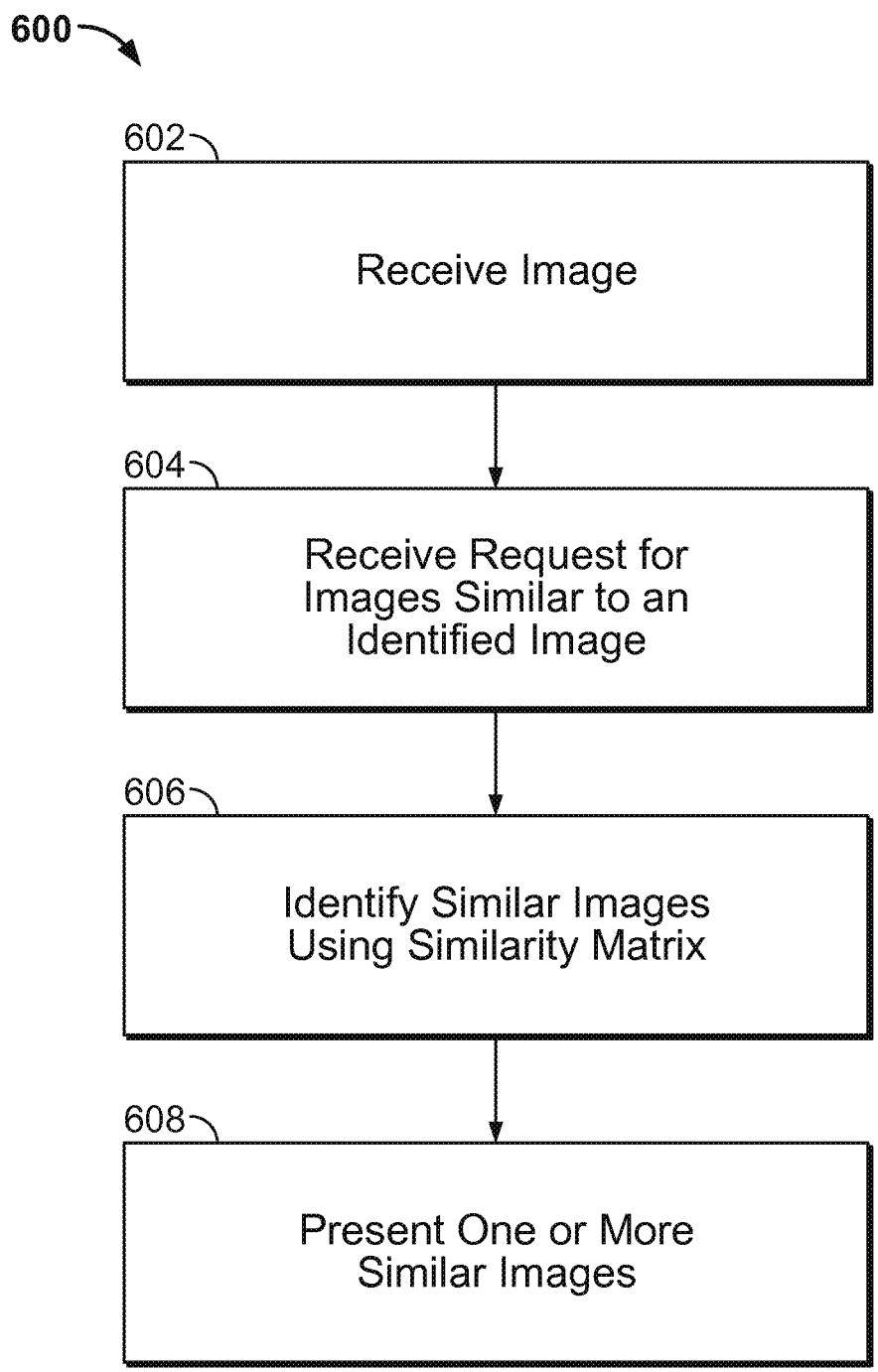
FIG. 6 is a flow chart of an example method for providing similar images.

FIG. 6 is a flow chart of an example method 600 for providing similar images. For convenience, the method 600 will be described with respect to a system that performs the method 600.

The system receives 602 an image. For example, the image can be received based on a user selection of an image (e.g., selection of an image representation presented in a set of image search results provided in response to a text query for images or selected from an image collection).

For example, for a text query for images, image search results responsive to the search query are identified. For example, the system can receive image search results from a search engine. The search results can include references to particular image resources represented, for example, by thumbnail representations of the resources. For example, image search results responsive to an image query "San Francisco" can include a thumbnail representing a number of different resources and represent various content associated with San Francisco. For example, the image resources can include images of the city skyline, maps, cable cars, or various landmarks (e.g., the Golden Gate Bridge, Alcatraz, or Alamo Square). Thus, while all relevant and responsive to the query, the image resources often include images that are not similar to one another.

The system receives 604 a request for images similar to an identified image of the image search results. The request can be part of the user selection providing the image, or a separate action. For example, a user can select a particular image within a search result interface and indicate a request for similar images to the selected image (e.g., using a right-click menu or interface menu). Alternatively, in some other implementations, the user first selects a menu for identifying similar images and then identifies a particular image of the search results as a base image for finding similar images. For example, the user can request similar images to an image resource of the search results representing the Golden Gate Bridge.

The system identifies 606 similar images to the received image using a similarity matrix. In particular, the system identifies the selected image within the similarity matrix. The system then identifies images in the similarity matrix having a similarity to the selected image that is greater than a threshold similarity, where the threshold can be selected based on empirical data.

The system presents 608 one or more similar images. For example, the system can present the one or more similar images in the search results interface with respect to the base image.

In some alternative implementations, the image query can be submitted to a particular labeled repository of images where the query is matched to one or more labels and corresponding images are returned based on the matched label or labels. Similar images to a returned image can be identified using a similarity matrix as described above.

While the specification has described the identification of similar resources in the context of images, other resources can be similarly identified and presented in a similar manner to identifying similar images in FIGS. 1-6. These other resources can include, for example, audio and video resources.

For example, collections of audio data can be trained in a similar manner using sampled audio triplets from a collection of audio to generate a similarity matrix for identifying similar audio.

In particular, a collection of audio files can also include associated data, for example, labeling information or query record information for organizing the audio files in the collection. Thus, audio files can be sampled into triplets where one audio file is more similar to a particular audio file and one audio file is less similar to the particular audio file.

Sparse features can also be extracted from each audio file. An audio file can be converted into an auditory image for a number of frames, each corresponding to specified time range of the audio data in the file. The auditory image can then be divided into sub-images (e.g., by box-cutting) and processed to identify a bag-of-features representation. Specifically, a feature extractor can be applied to each sub-image to generate a local sparse code vector for that sub-image. The system approximates each of the vectors that represent the sub-images in the auditory image with sparse codes. The system can use either vector quantization or matching pursuit to approximate the vectors. The system collects the sparse codes from all the sub-images to make a large sparse code vector for the entire audio frame. In particular, once each rectangle has been converted into a sparse code they are concatenated into one high-dimensional sparse vector, representing the entire auditory image. To represent an entire audio file, the system combines 306 the sparse vectors representing individual frames into a sparse vector representing the audio data of the audio file, e.g., by simply summing them up.

Sampled audio file triplets and their corresponding sparse feature representations can be used to train a similarity function to generate a similarity matrix as described above. For a resulting similarity matrix, similar audio can be identified for received input audio. For example, for a given sound a user can identify sounds that are semantically similar to the given sound.

Figure 7:
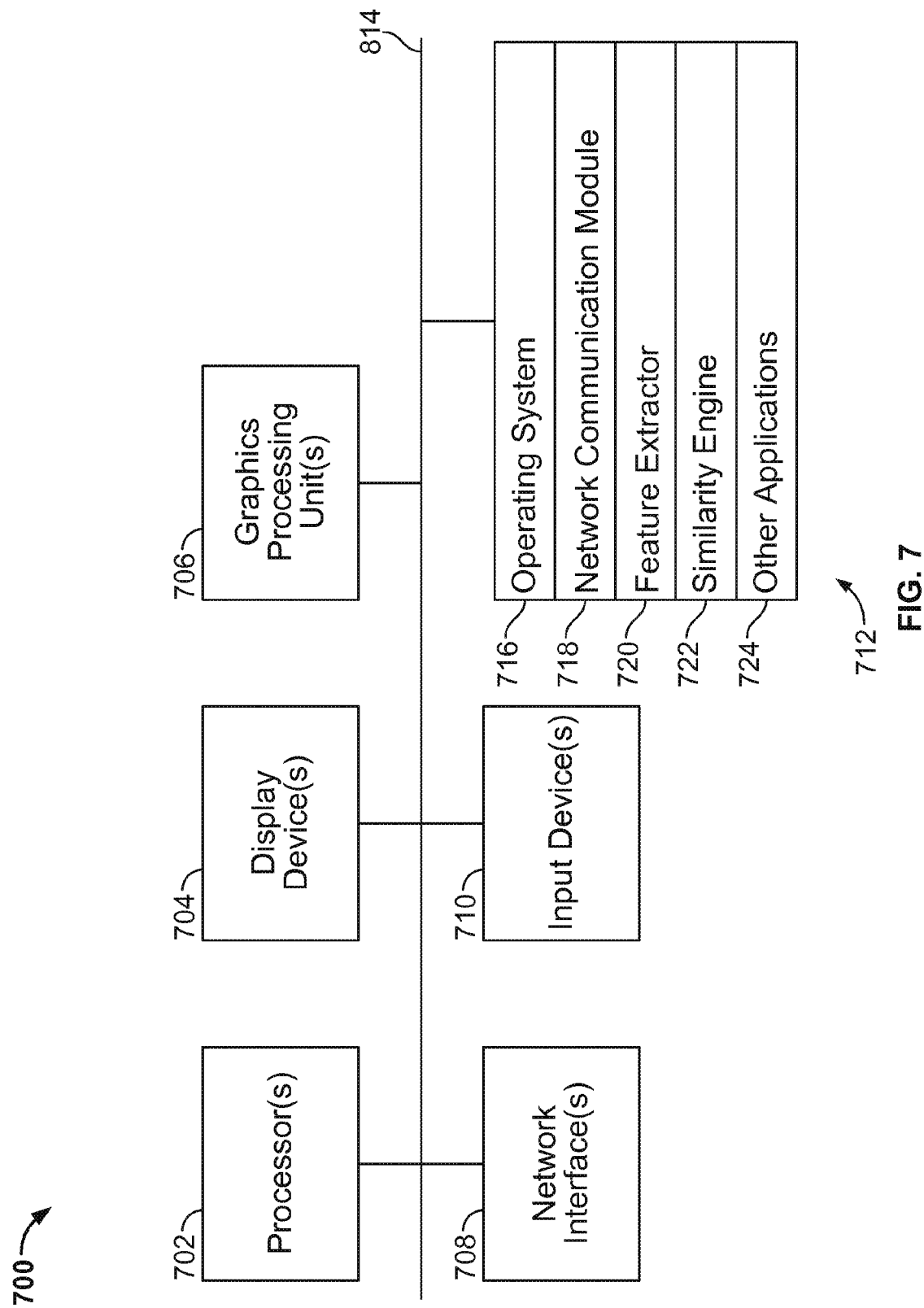
FIG. 7 illustrates an example system architecture.

FIG. 7 illustrates an example system architecture 700. The system architecture 700 is capable of performing operations for learning image similarity and retrieval of similar images. The system architecture 700 includes one or more processors 702 (e.g., IBM PowerPC, Intel Pentium 4, etc.), one or more display devices 704 (e.g., CRT, LCD), graphics processing units 706 (e.g., NVIDIA GeForce, etc.), a network interface 708 (e.g., Ethernet, FireWire, USB, etc.), input devices 710 (e.g., keyboard, mouse, etc.), and one or more computer-readable mediums 712. These components exchange communications and data using one or more buses 714 (e.g., EISA, PCI, PCI Express, etc.).

The term "computer-readable medium" refers to any medium that participates in providing instructions to a processor 702 for execution. The computer-readable medium 712 further includes an operating system 716 (e.g., Mac OS®, Windows®, Linux, etc.), a network communication module 718, a feature extractor 720, and a similarity engine 722.

The operating system 716 can be multi-user, multiprocessing, multitasking, multithreading, real-time and the like. The operating system 716 performs basic tasks, including but not limited to: recognizing input from input devices 710; sending output to display devices 704; keeping track of files and directories on computer-readable mediums 712 (e.g., memory or a storage device); controlling peripheral devices (e.g., disk drives, printers, etc.); and managing traffic on the one or more buses 714. The network communications module 718 includes various components for establishing and maintaining network connections (e.g., software for implementing communication protocols, such as TCP/IP, HTTP, Ethernet, etc.).

The feature extractor 720 and similarity engine 722 provide various software components for performing the various functions for extracting sparse features from images and training image similarity for a collection of images using the sparse features as described with respect to FIGS. 1-6.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method for training an image similarity function, comprising:
   sampling a plurality of image triplets from a plurality of images, where each image triplet $(p_i, p_i^+, p_i^-)$ includes an image $p_i$, a more relevant image $p_i^+$, and a less relevant image $p_i^-$, and where each of the images in each image triplet has a corresponding vector representation $v_i, v_i^+, v_i^-$; and
   training a pairwise similarity function $S(p_i, p_j)$ using the plurality of image triplets and the corresponding vector representations as training data.

2. The method of claim 1, where the image $p_i^+$ has greater similarity to $p_i$, and an image $p_i^-$; has lesser similarity to $p_i$.

3. The method of claim 1, wherein training the pairwise similarity function comprises determining a similarity matrix W from the plurality of image triplets and the corresponding vector representations, where $$S(p_i, p_j) \equiv v_i^T W v_j.$$

4. The method of claim 3, where training the image similarity function further comprises iteratively sampling image triplets $p_i, p_i^+, p_i^-$ and using vector representations of the sampled images to update the similarity matrix for each iteration.

5. The method of claim 1, where the similarity function is trained such that:
   $S(p_i, p_i^+) > S(p_i, p_i^-) + c$, for the images in each image triplet.

6. The method of claim 1, where sampling the plurality of image triplets comprises, for each triplet: selecting, for the image $p_i^+$, an image that shares one or more same labels or queries with the image $p_i$.

7. The method of claim 6, further comprising for each triplet: selecting, for the image $p_i^-$, an image that does not share a label or query with the image $p_i$.

8. The method of claim 1, where sampling the plurality of image triplets comprises, for each triplet:

identifying a relevance feedback value $r(p_i, p_j)$ for each image $p_j$ in the plurality of images, where the relevance feedback value is based on a fraction of queries that both images $p_i$ and $p_j$ are relevant for;

selecting, for the image $p_i^+$, an image that has a higher relevance feedback value than the image $p_i^-$; and selecting, for the image $p_i^-$, an image that has a lower relevance feedback value than the image $p_i^+$.

9. A system comprising:

a processor; and non-transitory computer-readable medium coupled to the processor and having instructions stored thereon, which, when executed by the processor, cause the processor to perform operations comprising:

sampling a plurality of image triplets from a plurality of images, where each image triplet $(p_i, p_i^+, p_i^-)$ includes an image $p_i$, a more relevant image $p_i^+$, and a less relevant image $p_i^-$, and where each of the images in each image triplet has a corresponding vector representation $v_i$, $v_i^+$, $v_i^-$; and training a pairwise similarity function $S(p_i, p_j)$ using the plurality of image triplets and the corresponding vector representations as training data.

10. The system of claim 9, where the image $p_i^+$ has greater similarity to $p_i$, and an image $p_i^-$ has lesser similarity to $p_i$.

11. The system of claim 9, wherein training the pairwise similarity function comprises determining a similarity matrix W from the plurality of image triplets and the corresponding vector representations, where $$S(p_i,p_j)=v_i^T W v_j.$$

12. The system of claim 11, where training the image similarity function further comprises iteratively sampling image triplets $p$, $p_i^+$, $p_i^-$ and using vector representations of the sampled images to update the similarity matrix for each iteration.

13. The system of claim 9, where the similarity function is trained such that:

$S(p_i, p_i^+) > S(p_i, p_i^-) + c$, for the images in each image triplet.

14. The system of claim 9, further comprising:

receiving an image search query;

presenting image search results responsive to the image search query;

receiving an input requesting images similar to an image of the image search results;

identifying similar images in a collection of images in response to the input using the image similarity function; and presenting one or more of the similar images.

15. The system of claim 9, where sampling the plurality of image triplets comprises, for each triplet:

identifying a relevance feedback value $r(p_i, p_j)$ for each image $p_j$ in the plurality of images, where the relevance feedback value is based on a fraction of queries that both images $p_i$ and $p_j$ are relevant for;

selecting, for the image $p_i^+$, an image that has a higher relevance feedback value than the image $p_i^-$; and selecting, for the image $p_i^-$, an image that has a lower relevance feedback value than the image $p_i^+$.

16. A non-transitory computer-readable medium having instructions stored thereon, which, when executed by a processor, cause the processor to perform operations comprising:

sampling a plurality of image triplets from a plurality of images, where each image triplet $(p_i, p_i^+, p_i^-)$ includes an image $p_i$, a more relevant image $p_i^+$, and a less relevant image $p_i^-$, and where each of the images in each image triplet has a corresponding vector representation $v_i$, $v_i^+$, $v_i^-$; and training a pairwise similarity function $S(p_i, p_j)$ using the plurality of image triplets and the corresponding vector representations as training data.

17. The computer-readable medium of claim 16, where the image $p_i^+$ has greater similarity to $p_i$, and an image $p_i^-$ has lesser similarity to $p_i$.

18. The computer-readable medium of claim 16, wherein training the pairwise similarity function comprises determining a similarity matrix W from the plurality of image triplets and the corresponding vector representations, where $$S(p_i,p_j)=v_i^T W v_j.$$

19. The computer-readable medium of claim 18, where training the image similarity function further comprises iteratively sampling image triplets $p$, $p_i^+$, $p_i^-$ and using vector representations of the sampled images to update the similarity matrix for each iteration.

20. The computer-readable medium of claim 16, where the similarity function is trained such that:

$S(p_i, p_i^+) > S(p_i, p_i^-) + c$, for the images in each image triplet.

* * * * *